(12) United States Patent
Feucht et al.

(10) Patent No.: US 9,981,321 B2
(45) Date of Patent: May 29, 2018

(54) TOOL, MACHINE TOOL, AND WORKPIECE MACHINING METHOD

(71) Applicant: SAUER ULTRASONIC GMBH, Deutschland (DE)

(72) Inventors: Florian Feucht, Deutschland (DE); Jens Ketelaer, Deutschland (DE)

(73) Assignee: SAUER ULTRASONIC GMBH, Stipshausen (DE)

( * ) Notice: Subject to any disclaimer, the term of this patent is extended or adjusted under 35 U.S.C. 154(b) by 118 days.

(21) Appl. No.: 14/893,960

(22) PCT Filed: May 30, 2014

(86) PCT No.: PCT/EP2014/061290
§ 371 (c)(1),
(2) Date: Nov. 25, 2015

(87) PCT Pub. No.: WO2014/191566
PCT Pub. Date: Dec. 4, 2014

(65) Prior Publication Data
US 2016/0107244 A1      Apr. 21, 2016

(30) Foreign Application Priority Data

May 31, 2013   (DE) .......................... 10 2013 210 199

(51) Int. Cl.
*B23B 37/00*          (2006.01)
*B23B 29/12*          (2006.01)
(Continued)

(52) U.S. Cl.
CPC ............ *B23B 37/00* (2013.01); *B23B 29/125* (2013.01); *B23C 5/006* (2013.01); *B23C 5/06* (2013.01);
(Continued)

(58) Field of Classification Search
CPC .. B23B 37/00; B23B 29/125; B23B 2260/108
See application file for complete search history.

(56) References Cited

U.S. PATENT DOCUMENTS

2011/0222975 A1*   9/2011   Short .................... B23B 29/125
                                                                      408/17

FOREIGN PATENT DOCUMENTS

CN             103052457 A      4/2013
DE       10 2010 048 638 A1     1/2012
(Continued)

OTHER PUBLICATIONS

English Translation of DE 102011077568 A1, Dec. 2012.*
(Continued)

*Primary Examiner* — Alan Snyder
(74) *Attorney, Agent, or Firm* — Westerman, Hattori, Daniels & Adrian, LLP

(57) ABSTRACT

A tool (20) has a machine-side machine connection (21) for connecting the tool to a machine tool (1) for driving the tool in rotation (27) about a rotation axis (29) and for advancing (26) the tool relative to a workpiece, a workpiece-side tool head (22) having one or more cutting edges (25) for machining a workpiece, wherein the diameter (D) of the tool head is greater than 20 mm and wherein the cutting edges (25) of the tool (20) are arranged such that they travel over an area perpendicular to the rotation axis (29), a vibration unit (23) which is designed to set the tool head into rotary vibration (28) about the rotation axis (29), and a power receiving means (24) for wirelessly receiving supplied energy and for supplying electrical energy to the vibration unit (23).

18 Claims, 6 Drawing Sheets

Figure 1:
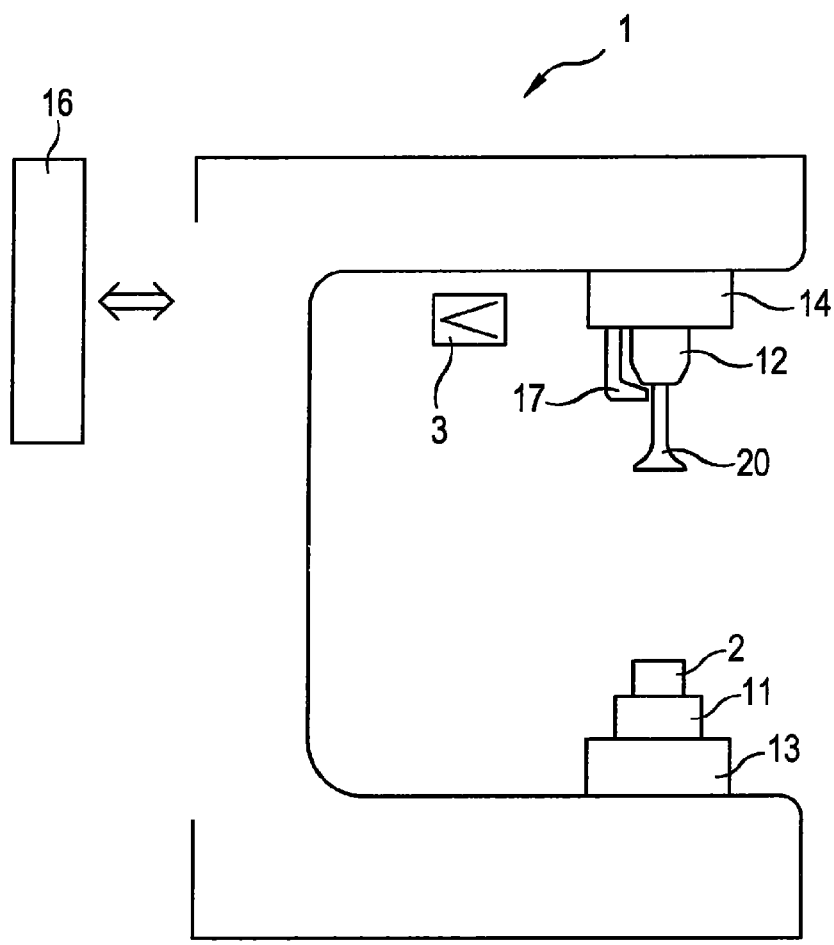

(51) Int. Cl.
*B23C 5/00* (2006.01)
*B23C 5/06* (2006.01)
*B23C 5/16* (2006.01)

(52) U.S. Cl.
CPC .......... *B23C 5/16* (2013.01); *B23B 2260/108* (2013.01); *B23B 2270/022* (2013.01); *B23C 2270/022* (2013.01)

(56) References Cited

FOREIGN PATENT DOCUMENTS

| | | | | |
|---|---|---|---|---|
| DE | 102011077568 A1 * | 12/2012 | ........... | B23B 29/125 |
| JP | H04-129610 A | 4/1992 | | |
| JP | H05-23901 A | 2/1993 | | |
| JP | 7-299629 A | 11/1995 | | |
| JP | H07-299629 A | 11/1995 | | |
| JP | H10-263911 A | 10/1998 | | |
| JP | 2002-346817 A | 12/2002 | | |
| JP | 2004-322233 A | 11/2004 | | |
| JP | 2008-110464 A | 5/2008 | | |
| JP | 2010-194614 A | 9/2010 | | |
| WO | 2012/007583 A1 | 1/2012 | | |
| WO | 2014/064009 A1 | 5/2014 | | |

OTHER PUBLICATIONS

International Search Report dated Mar. 17, 2017, issued in counterpart Japanese Application No. 2016-516190, with machine translation. (55 pages).

Notification of Reasons for Refusal dated Apr. 11, 2017, issued in counterpart Japanese Application No. 2016-516190, with machine translation (9 pages).

Office Action dated Dec. 2, 2016, issued in counterpart Chinese Application No. 201480030371.2 (7 pages). Statement: This Chinese Office Action cites the above-noted Chinese Document CN103052457 as allegedly being of interest. An English abstract and English machine translation of CN103052457 is included in this submission.

G. V. Pititsyn, et al., "Ultrasonic Equipment For Machining Holes on Drilling Machines", Stanki 1 instrument, vol. 51, Issue 4, 1980, pp. 31-32. XP-002207433. (Cited in IPER dated Dec. 1, 2015).

International Preliminary Report and Written Opinion dated Dec. 1, 2015 issued in counterpart application No. PCT/EP2014/061290 (17 pages)(Translation).

* cited by examiner

TOOL, MACHINE TOOL, AND WORKPIECE MACHINING METHOD

It is known to work on workpieces in a chipping manner with tools having a defined cutting edge. The known methods are drilling, turning, milling and planing. The related tools have one or more clearly defined and clearly describable cutting edges. By a relative movement between tool, particularly its cutting edge, and workpiece (cutting movement) the chipping machining is effected. It has a certain removal rate at a certain tool wear and leaves surfaces with properties that are foreseeable to some extent. When drilling, usually the tool is moved. When turning, usually the workpiece is moved. When milling, usually the milling tool rotates while it or the workpiece undergoes a translational movement. When planing, either the tool or the workpiece is translated. The workpiece may itself be a tool that is manufactured by the described tool.

It is further known to machine workpieces by vibrating tools without defined cutting edges. The vibrating tools have rough surfaces and operate grindingly at relatively high frequencies (vibration frequency), for example frequencies of above 5 kHz, or above 10 kHz, or above 20 kHz. Because of the high vibration frequencies, which may be beyond human hearing, this kind of working is often called ultrasonic working, and the machine is called ultrasonic machine. The vibration of the tool may be a translational or a rotational vibration. The tool may move parallel to the workpiece and then remove material in a grinding manner. However, it may also operate in a punching manner on the workpiece.

DE 102008048638 A1 describes tools with defined cutting edges having a drilling movement onto which a vibration is superimposed.

A disadvantage of the known tools is that tools of large diameters are deemed not to be readily usable in vibrating operation due to their size and mass.

It is the object of the invention to provide a tool of relatively large diameter that can well be used in vibration operation.

This object is accomplished by the features of the independent claims. Dependent claims are directed on preferred embodiments of the invention.

A tool has a machine-side machine connector (such as HSK or in the shape of a coupling cone) for connecting the tool with a machine tool, a workpiece-side tool head with one or more defined cutting edges for machining the workpiece, wherein the diameter of the tool head is larger than 20 mm, and wherein the cutting edges of the tool may be arranged such that, in operation, they cover and machine an area perpendicular to the rotation axis, a vibration unit adapted to drive the tool head into a rotation vibration around the rotation axis, and power receiving means for receiving power that is supplied wirelessly and supplying electric power to the vibration unit.

The turning vibration has amplitudes depending on diameter. At large radii the disadvantage of low amplitudes is partly levelled due to the mechanical translation. The amplitude can be enlarged by using resonance effects in certain manners.

The power receiving means may comprise an induction coil that is directly or indirectly connected with one or more vibration drives (e.g., piezo elements) in the vibration unit. It may be ring-shaped and concentric to the rotation axis and can be adapted for cooperation with a stationary coil facing it in axial direction. The translation direction of the tool may be perpendicular (face milling cutter) or parallel (a drill) to the rotation axis. The part of the tool head engaging the workpiece may have a diameter of above 25 mm or above 30 mm, and/or below 150 mm or below 100 mm or below 80 mm.

The tool may comprise an elongated vibration part extending along the rotation axis having at its driven end the vibration unit, at its driving end the tool head, and between the two ends an intermediate portion connected to the machine connector.

The tool may be dimensioned and operated such that the vibration frequency is a torsional resonance frequency of the vibration part or a multiple thereof, wherein the driven end and/or the driving end may be in a range of ±20%, or ±10%, or ±5% of the resonance wavelength around a vibration maximum (anti-node), and/or wherein the intermediate part, and particularly its attachment part towards the connector, may be in a region of ±20%, or ±10%, or ±5% of the resonance wavelength around a vibration node.

A machine tool has a machine frame, a workpiece table mounted thereon for holding a workpiece, a machine spindle mounted to the machine frame for taking a tool as described above, power sending means for wirelessly sending power to power receiving means of the tool, and a control adapted to operate the machine, particularly the spindle and the power sending means.

Figure 2:
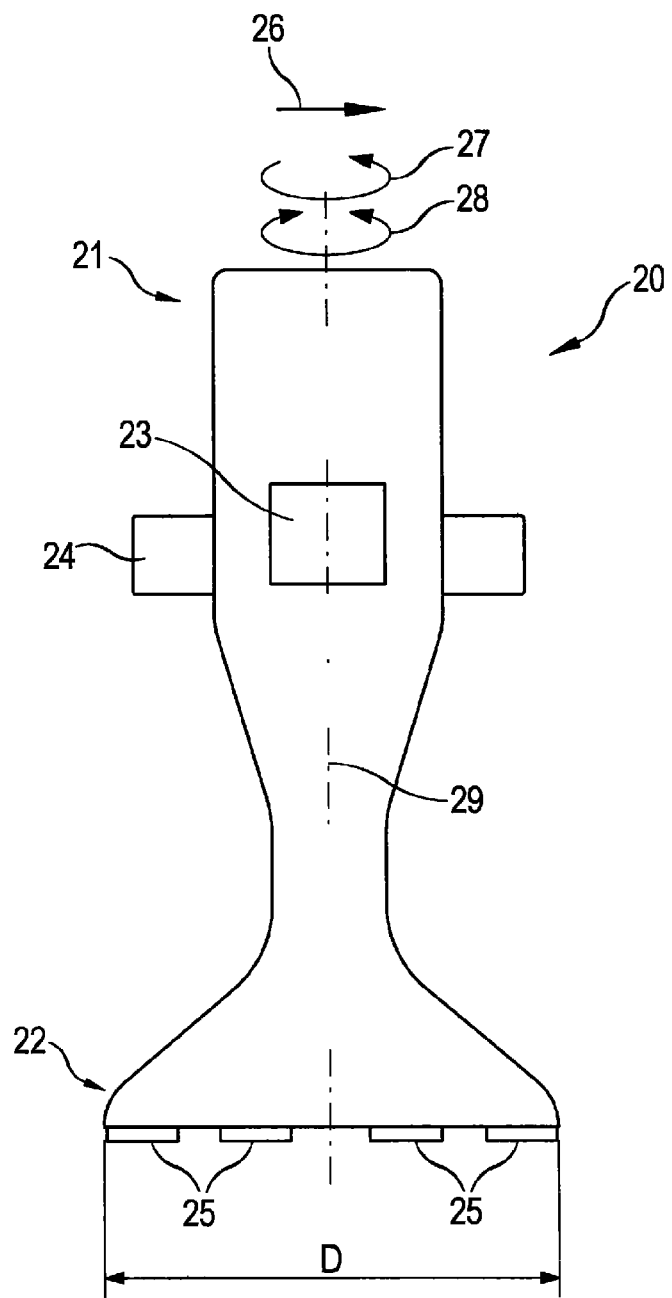
Figure 3:
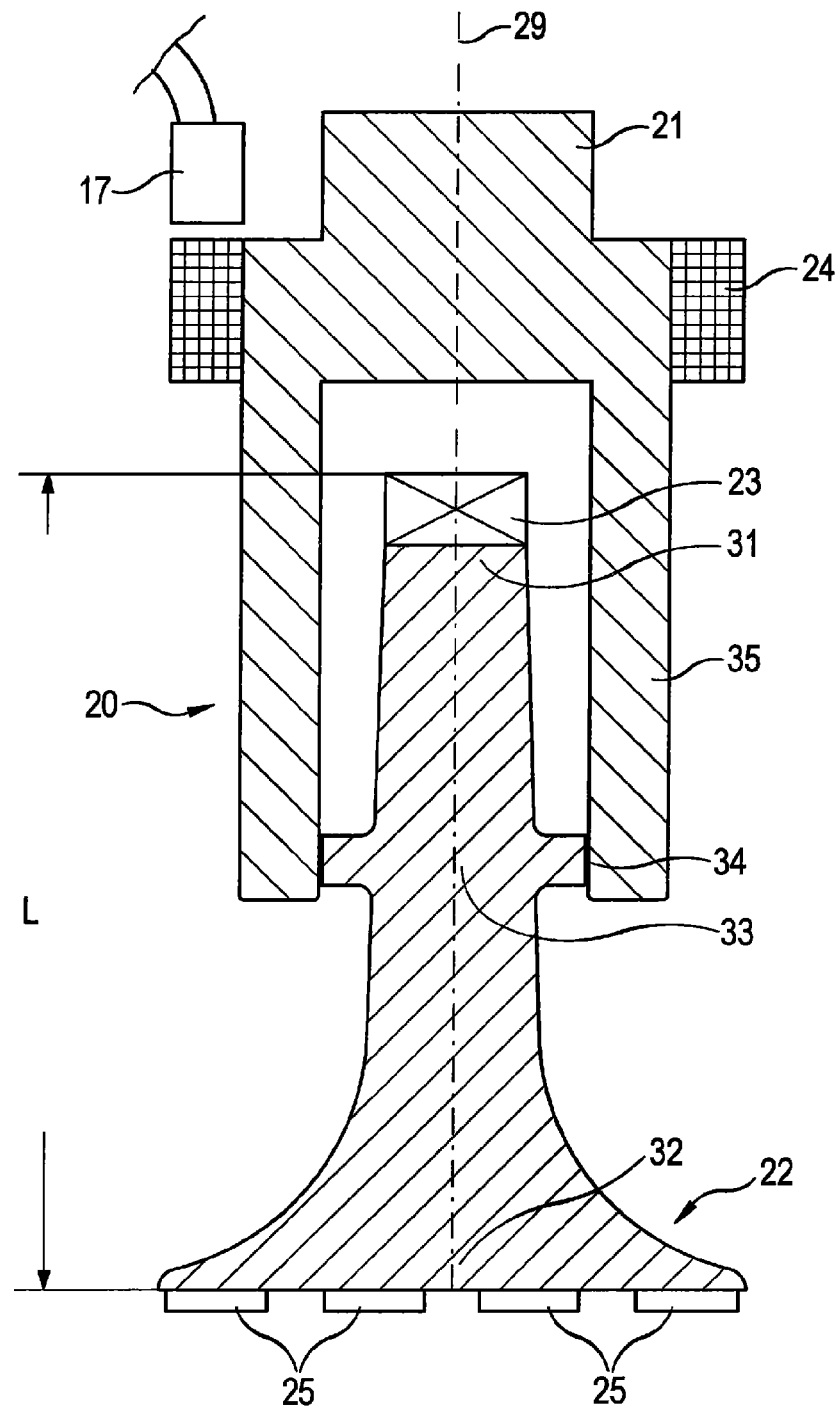
Figure 4:
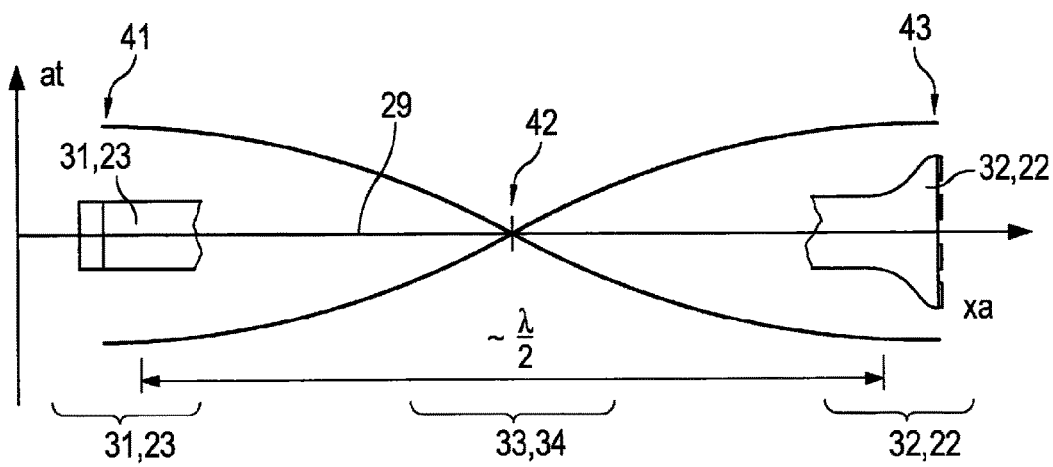
Figure 5:
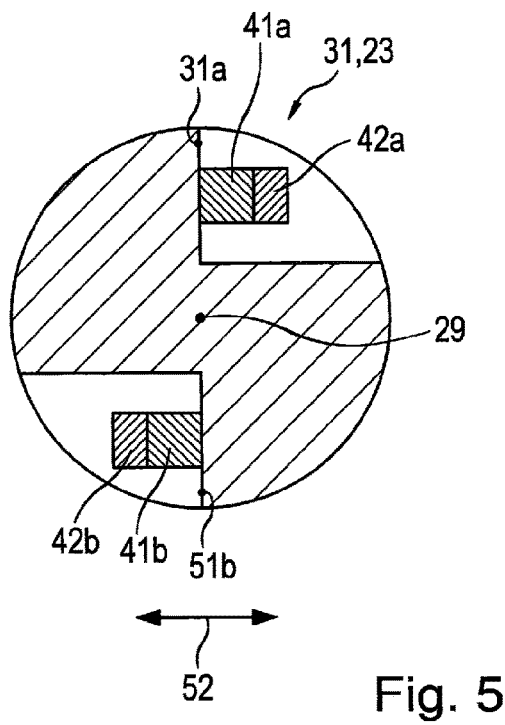

In the following, embodiments of the invention are described with reference to the drawings, in which FIG. 1 schematically shows a view of a machine tool,
FIG. 2 schematically shows a tool,
FIG. 3 schematically shows a tool,
FIG. 4 shows explanations on vibration behavior,
FIG. 5 shows an embodiment of the vibration drive, and
FIG. 6 shows further embodiments of the tool.

FIG. 1 shows a machine tool 1 schematically. It comprises a machine frame 10. In operation, the workpiece 2 and the tool 20 are attached to the machine frame 10 through various intermediate parts. Plural control axes 13, 14 may be provided for the static adjustment of translational and/or rotational positions of the tool 20 and/or the workpiece 2. A spindle 12 for tool 20 is provided for rotating it. Adjusting axes 13 may be provided between machine frame 10 and workpiece table 11, and/or adjusting axes 14 may be provided between machine frame 10 and tool 20 or spindle 12. One or more of the adjusting axes 13 may, in operation, also provide a translational or rotational motion of the tool 20 relative to the workpiece 2.

Generally, the machine tool 10 may comprise sensors 3 for detecting process parameters. The sensors may comprise one or plural sensors distributed across the machine tool. Signals are fed back by wires to the controller/feedback controller 16 and are memorized and/or output and/or used for driving various machine components (axes 13, 14, spindle drive 12, power supply 17). Besides, a not shown output unit for an operator may be provided.

The tool 20 may be a milling cutter, particularly a face milling cutter which is, during workpiece machining, electrically driven into rotation movement. However, it may also be a drill.

The tool 2 may be exchangeable via a standardized coupling such that it can be exchanged quickly and automatically. The coupling 21 may be a usual cone coupling (coupling cone, HSK) with mating tool-side and spindle-side portions.

The machine tool shown in FIG. 1 is adapted for operating with a tool as schematically shown in FIG. 2, 3 or 6. Particularly, the control 16 is adapted for suitably operating the tool. Besides the usual functions, such as controlling the axes 13, 14, controlling the spindle, this may also involve driving power sending means 17 with suitable signals of particularly suitable amplitude and/or suitable frequency and/or suitable timings. Amplitude and frequency may be stored in controller 16 in dependence of the tool, or may be stored as part of a control program.

FIG. 2 schematically shows, in a side view, a tool 20. Schematically indicated is rotation axis 29, the rotation 27 caused by spindle 12, the relative motion 26 of tool 20 compared to workpiece 2, which is caused by axis 13 and/or 14, and the rotation vibration 28 (torsional vibration) caused by vibration drive 23.

21 symbolizes schematically the connection of the tool to machine tool 1. The machine connector 21 may be standardized. It may be a HSK-coupling of suitable diameter, or a cone-coupling, or the like. FIG. 2 shows the machine connector 21 only schematically.

22 designates the tool head that carries the cutting edges towards the workpiece 2. The cutting edges are defined cutting edges 25 that may fixedly be formed into the tool head 22 or that may be added through exchangeable cutting inserts, such as screwable cutting inserts. D designates the diameter of the tool, wherein it addresses the diameter at the tool, i.e. the measurement across the outermost portions of the cutting edges 25 or cutting inserts in radial direction. Diameter D is relatively large and is above 20 mm, preferably above 25 mm, or above 30 mm.

At least in radial outer parts of the tool head a torsional vibration has, due to the relatively large radius, an acceptable amplitude. The fact that a large tool with its high mass is difficult to vibrate with sufficient amplitude is, in torsional vibration, partially equalized by the fact that the amplitude increases with increasing distance from the axis 29 of the torsional vibration. The diameter D may be below 150 mm or below 100 mm.

Tool 20 may be waisted such that the machine connector 21 and possibly also the tool head 25 have a larger diameter than intermediate portions therebetween. The cutting edges 25 cover, in combination, when rotating around axis 29, preferably the face area (area perpendicular to the rotation axis 29) of the tool. As shown in FIG. 2, they may lie in a plane area. However, it may also be different. In other embodiments the cutting edges may be formed such that they act on the circumferential surface (relative to the rotation axis 29).

23 is a vibration unit adapted to bring the tool head into rotation vibration (indicated by arrow 28). It may comprise piezo elements. They are supplied with electric AC signals. The vibration frequency may immediately correspond to the frequency of the electric AC signal.

24 designates a power receiving means. It may be a ring-shaped induction coil flooded by a generated magnetic alternating field that generates, at its terminal, an induced voltage and, thus, supplies the electric power necessary for driving vibration unit 23. Depending on overall layout, the coil of the power receiving means 24 may directly be coupled with the piezo elements of the vibration unit 23, but likewise, circuit elements may be in between for shaping the power supply of the piezo elements (rectifying, inverting, amplitude control, . . . ).

FIG. 2 should not be understood such that the tool comprises a solid base body. The tool may be built by plural individual parts, for example arranged along the axial direction. The individual parts are then suitably connected, e.g. by screwing, soldering, welding, pressing, or the like.

FIG. 3 shows a sectional view of an embodiment of the tool, in which the tool comprises a vibration part 31-34 which is connected with the machine connector via a connection part 35. The vibration part has a certain length L extending substantially in parallel to the rotation axis 29. The vibration part has a driven end 31 and a driving end 32, and in between an intermediate part 33, 34. Vibration drive 23 is provided at the driven end 31. Tool head 22 and, particularly, the cutting edges 25 or cutting inserts are located at the driving end 32. The intermediate portion 33, 34 is between driven end 31 and driving end 32. It comprises a connection portion 34 through which the vibration part 31-34 is attached to machine connector 21. The attachment is rigid and suitable for reliably transmitting the forces generated during use.

The connection part 35 between connection portion 34 and machine connector 21 may be a tube-like or cylindrical structure 35 that surrounds the driven end 31 and the vibration drive 23 and that extends in axial direction from machine connector 21 towards the connection portion 34. The connection part 35 may be a full cylinder, i.e. closed around the circumference, or it may comprise openings or only some struts for connecting the connection portion 34 of the vibration part 31-34 with the machine connector 21.

FIG. 4 shows schematically an operation mode of the tool shown in FIG. 3. It shows a diagram that has as an abscissa the axial position xa along the rotation axis 29, and as an ordinate the amplitude of the torsional vibration around axis 29. Various portions of the vibration part 31-34 are schematically drawn into the diagram.

Design and operation may be such that along the vibration part a vibration mode 42 with low amplitude of the torsional vibration (approximately 0) builds up. In the area of such a node 42 (minimal amplitude of the torsional vibration) the intermediate part 33 and, particularly, the connection portion 34 of the vibration part 31-34 may be located.

By positioning the intermediate part 33 and, particularly, the connection portion 34 in the range of the vibration node 42 one gains the advantage that retroaction of the vibrating system into the machine is minimized. The vibration part is held where its vibration is minimum. Then, likewise, vibrations that may propagate via the machine connector 21 towards the machine 1 are also minimum, so that disadvantageous interactions in the machine will be minimized.

Seen along the axial length, the torsional vibration has a wavelength $\lambda$ defined by the nodes and anti-nodes of the torsional vibration amplitude. FIG. 4 shows an embodiment in which the length L of the vibration part 31-34 of the tool is approximately half the wavelength $\lambda$, i.e. $\lambda/2$ of the torsional vibration. Left and right of node 42 there are torsional antinodes 41 and 43 vibrating with opposing phases. The two opposing curves intersecting at node 42 may be understood to be similar to an envelope, keeping in mind that torsional vibrations are described.

In the region of antinode 41 the driven end 31 of the vibration part 31-34 may be positioned, particularly, the vibration drive 23. In the region of the other antinode 43 there may be the tool head 22, and particularly the driving end 32 of the vibration part 31-34 together with the cutting edges 25 or the cutting inserts.

FIG. 4 shows a symmetrical design of the antinodes with respect to the node 42. This may be the case, but it is not necessarily like this. It depends on the particular mechanical construction of the tool where vibration nodes and vibration antinodes are. In other words, the wavelength $\lambda$ needs not be constant along the length of the vibration part, but may change depending on properties of the vibration part changing along the axial length, such as mass per length, local stiffness, and the like. The respective measures are computable or numerically simulatable or may be determined empirically. The design may, thus, also be such that one of the antinodes is closer to the node than the other antinode.

FIG. 4 shows the situation at a basic vibration. However, it is also conceivable that tool 20 is driven at higher nodes (harmonics, other resonances, . . . ). There may also be two or more nodes along the abscissa 29 between driven end 31 and driving end 32. However, in many cases, at least the tool head 22 and, particularly, also the vibration drive 23 will be placed at a vibration antinode, i.e. around λ/4 displaced from the node for optimizing the amplitude of the torsional vibration.

The indications of positioning the driven end 31 and/or driving end 32 or intermediate portions 33, 34 or connection portion 34 relative to vibration nodes or vibration antinodes may be understood to be subject to tolerances with a maximum of ±20%, or ±10%, or ±5% of the resonance wavelength λ at the respectively local relevant node or antinode.

Since also smallness of the build is desired, the length of the vibration part L may be smaller than λ, such as $0.4\lambda < L < 0.5\lambda$. Driving portion and driven portion are then still close to antinodes and, thus, lie in the region of sufficiently large amplitudes such that size decreases over-proportionally to vibration amplitude.

As far as resonances are considered, they may be those occurring on idling (tool not in engagement with workpiece) or under load (with force exerted at the tool head).

Vibration frequency and mechanical design of the tool depend on each other and are tuned with respect to each other when resonance effects are to be used. The machine drive is adapted to supply a suitable frequency to the tool via the power sending means 17. However, likewise, the design may be such that the machine supplies an arbitrary magnetic alternating field for obtaining inductive effects at the power sending means 24 of the tool. Voltage formation for operating the piezo drives 23, 41 may, regarding frequency and amplitude, then be made with a suitable circuit provided within tool 20 itself.

FIG. 3 shows again schematically the power receiving means 23. It may be shaped ring-like and may surround the tool completely. Also the power sending means 17 is indicated schematically. It may be distant from the power receiving means 24 in axial direction and be spaced by a thin slot. It may be formed like a ring segment and may face the coil of the power receiving means 24 only along a certain portion of the circumference of the ring, and may leave other portions free such that a tool changing mechanism may still pick the tool. The power sending means 17 generates a magnetic alternating field that floods the coil of the power receiving means 24 and generates there an induced voltage. The power sending means 17 is fixedly mounted at the machine.

FIG. 5 schematically shows a possible design of the vibration drive 23 at the driven end 31 in plan view on a section perpendicular to the vibration axis 29 through the driven end 31 of the vibration part. 41a and 41b are vibration drives mounted eccentrically with reference to the rotation axis 29, wherein they may be piezo elements. Their vibration axis is perpendicular to the mounting surface 51 corresponding to the shown arrow 52. Their respective one end is mounted at mounting surfaces and may be biased there by screws.

The other end of the piezo elements 41 (not provided at mounting surface 51) may vibrate freely or may be attached to a counter-mass element 42a, 42b. Depending on design it may be smaller or larger. The Figure shows individual counter-mass elements 42a, 42b. However, likewise, in axial rearward direction (away from the workpiece towards the machine) they may be connected with each other and comprise, again, a heavy and rigid structure. The counter-mass element 42a, 42b forms a floating abutment. Due to its inertia it is sufficiently effective, particularly at higher frequencies.

FIG. 5 shows two piezo elements 41a, 41b, but there may also be more piezo elements (3, 4, 5, 6 or more of them). Not shown are the electric wirings for supplying electric power from the power receiving means 24.

Figure 6A:
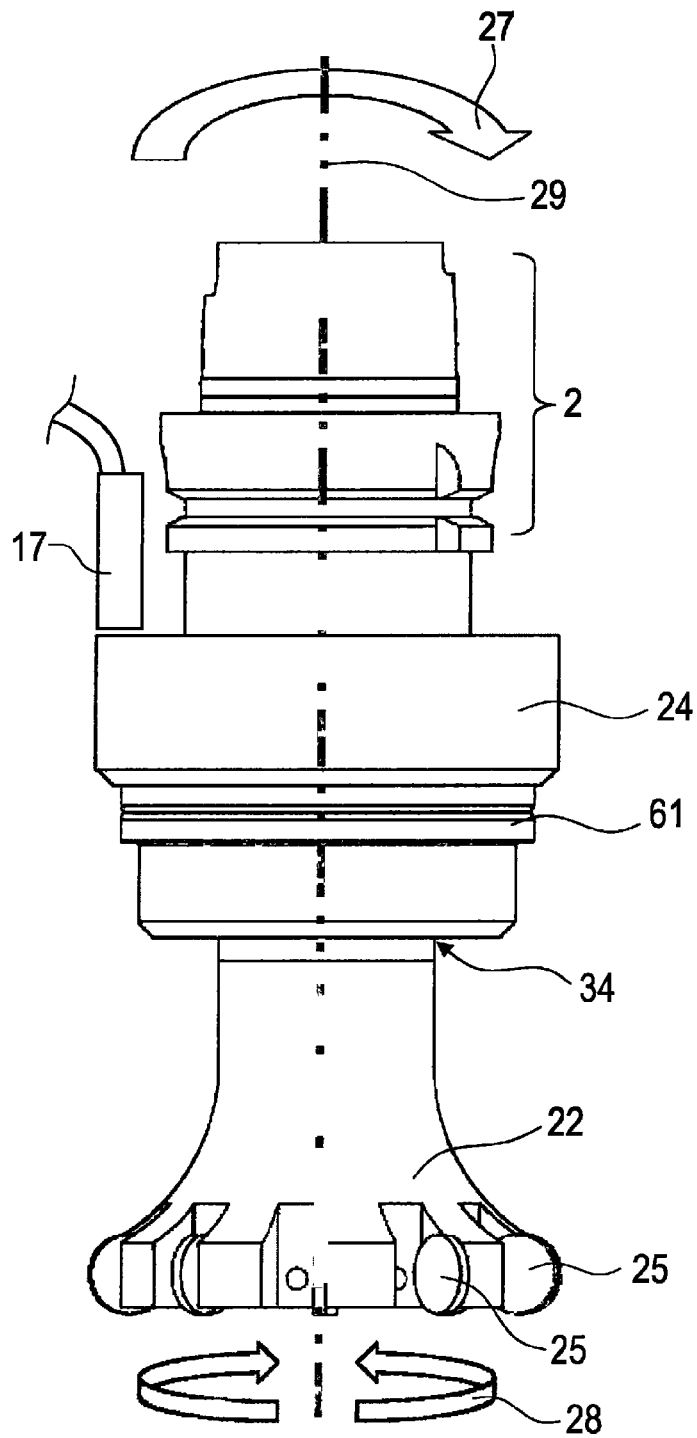
Figure 6B:
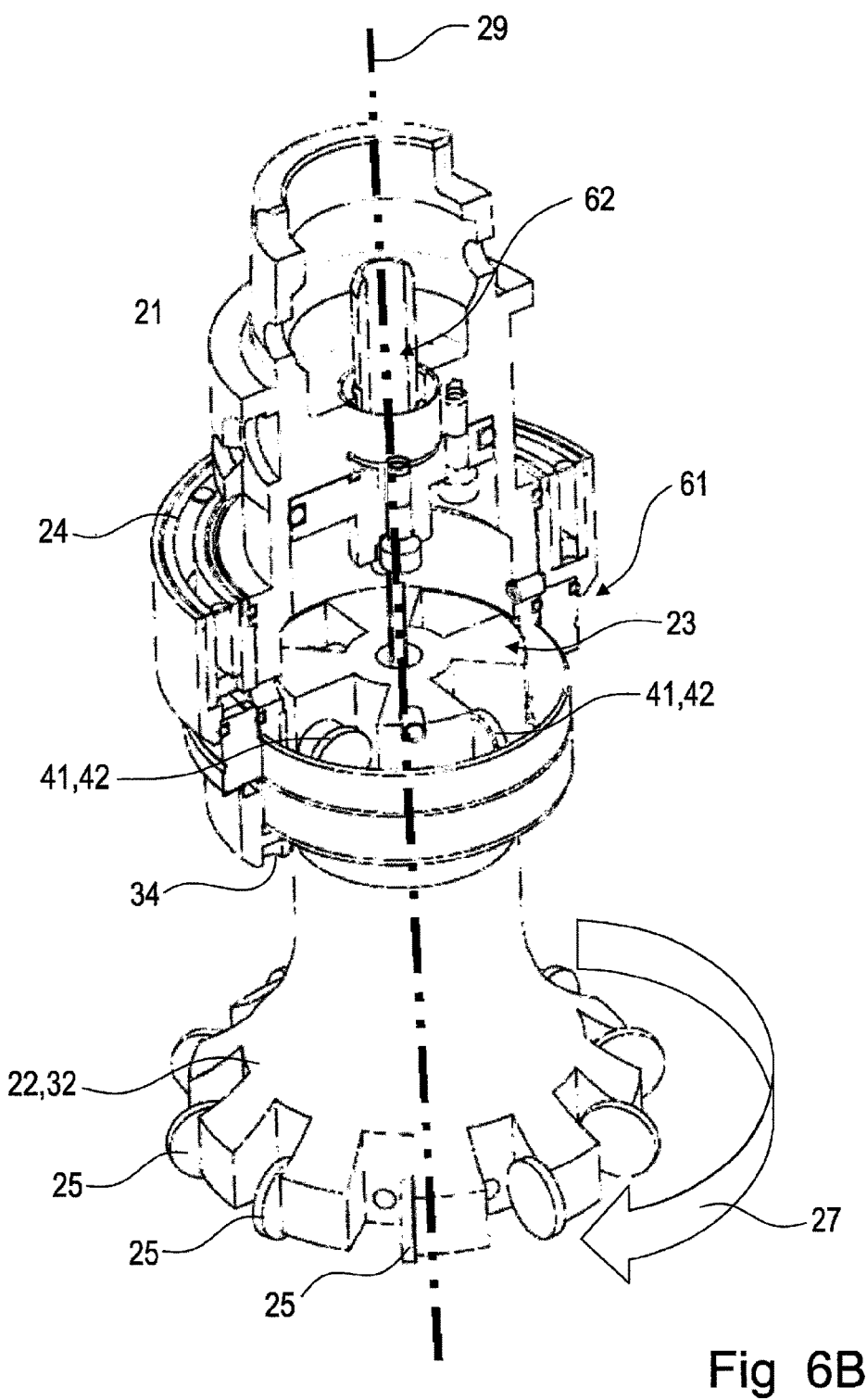

FIG. 6 shows a specific embodiment of the tool, in which FIG. 6A is a side view and FIG. 6B a perspective view, partially cut. 21 shows a HSK-coupling. 24 is the power receiving means formed as induction coil and that has, opposing in axial direction, a corresponding power sending means 17 that is fixedly attached to the machine. The tool head 22 is shown as comprising plural cutting inserts 25. They may be mounted at suitable mounting portions. In downward direction the tool head is formed mushroom-like in that in a downward direction its diameter increases. 61 symbolizes a balancing ring in which, for balancing the tool, material can deliberately be removed.

The embodiment in FIG. 6 indicates that the connection portion 34 is not placed symmetrically between driven end 31 and driving end 32, but is placed closer to the driven end. As already said, this depends on dimensionings and designs of the individual portions of the vibration part.

FIG. 6B indicates an embodiment in which the vibration drive 23 comprises four piezo elements distributed across the circumference corresponding to the four compartments in the driving part of the vibration part. 62 symbolizes a fluid guidance that may supply cooling fluid or lubricant.

In the shown embodiment, the coil of the power receiving means 24 may be the largest diameter. However, likewise, the tool head 22 together with the cutting edges 25 may form the largest diameter. As already said, the design may be waisted such that the diameter between tool head and machine connector is relatively small.

The diameter of the tool head (effective diameter at the workpiece) is more than 20 mm and may be more than 25 or more than 30 mm. It may be below 150 mm or below 100 mm.

The revolution speed of the tool may be above 500 rpm, or above 1000 rpm, or above 2000 rpm. It may be below 30,000 rpm, or below 24,000 rpm, or below 20,000 rpm.

The vibration frequency of the torsional vibration may be higher than 5 kHz, or higher than 10 kHz, or higher than 50 kHz, or higher than 20 kHz. It may be below 100 kHz, or below 80 kHz, or below 60 kHz.

A workpiece machining method comprises the steps of providing a tool with an effective diameter at the workpiece of above 20 mm, rotating the tool around its axis, applying a torsional vibration to the tool and advancing the tool relative to the workpiece. The parameters may be as described in the above specification.

Features described in this specification in relation to prior art or in relation to the invention shall be deemed combinable with each other, even if such combinations are not expressly described, as far as the combination is technically possible. Descriptions of method steps shall also be considered as means for implementing such method steps, and descriptions of means and components shall also be considered as descriptions of method steps implemented by such means.

The invention claimed is:
1. A tool (20), comprising:
a machine-side machine connector (21) for connecting the tool to a machine tool (1) for the rotational driving (27) of the tool around a rotation axis (29) and the advancement (26) of the tool relative to a workpiece,
a workpiece-side tool head (22) having one or more cutting edges for machining a workpiece, wherein the diameter of the tool head is larger than 20 mm, and wherein the cutting edges of the tool may be arranged such that they pass over a surface extending perpendicular to the rotation axis,
a vibration unit (23) adapted to evoke a rotation vibration (28) of the tool head around the rotation axis,
a power receiving means (24) for wireless receipt of power and supplying electric power to the vibration unit,
wherein the tool has an elongated vibration part (31-34) that extends along the rotation axis (29) and comprises
(i) the vibration unit (23) at its driven end (31),
(ii) the tool head (22) at its driving end (32) and
(iii) an intermediate portion (33, 34) between the two ends,
wherein the intermediate portion (33, 34) is fixedly attached to the machine connector (21), and
wherein the tool is dimensioned and operated such that
(iv) the vibration frequency is a torsional resonance frequency of the vibration part or a multiple thereof,
the intermediate portion at a connection portion towards the connection lies in a range of ±20% of the resonance wavelength around a vibration node (41, 43).

2. The tool according to claim 1,
wherein the power receiving means (24) comprises a coil flooded by a magnetic field,
the coil being directly or indirectly connected with one or more vibration drives (23) in the vibration unit.

3. The tool according to claim 2, wherein the coil is ring-shaped and concentric to the rotation axis (29) and is adapted for cooperation with a stationary coil facing it in axial direction.

4. The tool according to claim 1, wherein the advancement direction (26) is perpendicular to the rotation axis (29).

5. The tool according to claim 1, wherein the part of the tool head that engages the workpiece has a diameter of above 15 mm, or above 20 mm, or above 25 mm, and/or has a diameter below 150 mm, or below 100 mm, or below 80 mm.

6. The tool according to claim 1, wherein the vibration unit (23) comprises one or more piezo elements (41).

7. The tool according to claim 1, wherein the intermediate portion at the connection portion towards the connection lies in a range of ±10% of the resonance wavelength around the vibration node.

8. The tool according to claim 1, wherein the attachment of the intermediate portion and machine connector comprises a tube-like structure that
(i) surrounds the driven end (31),
(ii) has its one end connected to the intermediate portion (33, 34) and
(iii) has its other end connected to the machine connector (21).

9. The tool according to claim 1, wherein the
driven end comprises one or more vibration drives (41, 42) for translatory vibration and mounted eccentrically with respect to the rotation axis, their vibration axes being directed in circumferential direction with respect to the rotation axis (29).

10. The tool according to claim 6,
wherein the one end of a piezo element (41) is connected with an attachment surface at the driven end (31), and the other end is free or coupled with a counter-mass element (42).

11. The tool according to claim 1, which is dimensioned and operated such that
(i) the vibration frequency is a torsional resonance frequency of the vibration part (31-34) or a multiple thereof,
(ii) the driven end and/or the driving end are in a range of ±20%, or ±10%, or ±5% of the resonance wavelength around a vibration antinode (42).

12. The tool according to claim 7, wherein
the intermediate portion at the connection portion towards the connection lies in a range of ±5% of the resonance wavelength around the vibration node (41, 43).

13. The tool according to claim 1, wherein the vibration amplitude in circumferential direction at the outer diameter of the tool is above 0.5 μm, or above 1 μm, or above 2 μm.

14. The tool according to claim 1, wherein the vibration frequency is above 5 kHz, or above 10 kHz, or above 15 kHz, or below 100 kHz, or below 80 kHz, or below 60 kHz.

15. The tool according to claim 1, wherein the revolution speed of the tool is above 500 rpm, or above 1000 rpm, or above 2000 rpm, or below 30,000 rpm, or below 24,000 rpm, or below 20,000 rpm.

16. The tool according to claim 1, wherein the tool head (22) comprises one or more separate attachable cutting inserts (25).

17. The tool according to claim 1, wherein the machine connector comprises a standardized connecting part.

18. A machine tool (1), comprising a machine
frame (10), mounted thereto a workpiece table (11) for holding a workpiece (2), a tool spindle (12) mounted to the machine frame for receiving a tool (20) according to claim 1, a power sending means (17) for wirelessly sending power towards the power receiving means (24) of the tool, and a controller (16) adapted for operating the machine tool equipped with the tool.

* * * * *